United States Patent
Lou et al.

(10) Patent No.: US 9,784,865 B2
(45) Date of Patent: Oct. 10, 2017

(54) SYSTEM AND METHOD FOR ESTIMATING LATERAL POSITIONING UNCERTAINTIES OF A SEISMIC IMAGE

(71) Applicants: Xiaoting Lou, Houston, TX (US); Philip Steven Schultz, Bellaire, TX (US)

(72) Inventors: Xiaoting Lou, Houston, TX (US); Philip Steven Schultz, Bellaire, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 397 days.

(21) Appl. No.: 14/607,793

(22) Filed: Jan. 28, 2015

(65) Prior Publication Data

US 2016/0216391 A1  Jul. 28, 2016

(51) Int. Cl.
*G01V 1/30* (2006.01)
*G01V 1/28* (2006.01)

(52) U.S. Cl.
CPC .............. *G01V 1/303* (2013.01); *G01V 1/282* (2013.01); *G01V 2210/6222* (2013.01); *G01V 2210/667* (2013.01)

(58) Field of Classification Search
None
See application file for complete search history.

(56) References Cited

U.S. PATENT DOCUMENTS

| | | |
|---|---|---|
| 5,991,237 A | 11/1999 | de Bazelaire |
| 5,995,904 A | 11/1999 | Willen et al. |
| 6,611,761 B2 | 8/2003 | Sinha et al. |
| 7,050,355 B2 | 5/2006 | Robertsson et al. |
| 7,349,807 B2 | 3/2008 | Moos et al. |
| 7,791,981 B2 | 9/2010 | Kiyashchenko et al. |
| 7,894,299 B2 | 2/2011 | Meier |
| 8,121,823 B2 | 2/2012 | Krebs et al. |
| 8,341,984 B2 | 1/2013 | Bachrach et al. |

(Continued)

OTHER PUBLICATIONS

Felix Waldhauser, A Parametrized Three-Dimensional Alpine Crustal Model and Its Application to Teleseismic Wavefront Scattering, 1996, 181 pages.*

(Continued)

*Primary Examiner* — Tung Lau
(74) *Attorney, Agent, or Firm* — Marie L. Clapp

(57) ABSTRACT

A method of estimating lateral positioning uncertainties of a seismic image is performed at a computer system. The computer system receives a velocity model, the velocity model including a plurality of base velocity values used for generating the seismic image, each base velocity value having a low limit and a high limit. The computer system derives a plurality of lateral velocity gradient uncertainties from the velocity model and generates multiple lateral velocity gradient profiles, each lateral velocity gradient profile including a random realization of the plurality of lateral velocity gradient uncertainties. The computer system calculates perturbation raypaths originating from a surface point of the seismic image based on the velocity model and the multiple lateral velocity gradient profiles and estimates a lateral positioning uncertainty for a target location at a predefined depth of the seismic image based on lateral distributions of the perturbation raypaths at the predefined depth.

21 Claims, 8 Drawing Sheets

(56) References Cited

U.S. PATENT DOCUMENTS

| | | |
|---|---|---|
| 8,428,880 B2 | 4/2013 | Kiyashchenko et al. |
| 8,494,777 B2 | 7/2013 | Khadhraoui et al. |
| 8,600,708 B1 | 12/2013 | Mallet et al. |
| 8,612,155 B2 | 12/2013 | Khadhraoui et al. |
| 8,694,299 B2 | 4/2014 | Krebs et al. |
| 8,731,838 B2 | 5/2014 | Winbow et al. |
| 8,767,508 B2 | 7/2014 | Leahy et al. |
| 2005/0197780 A1* | 9/2005 | Moos ............... G01V 1/30 702/14 |
| 2009/0303834 A1 | 12/2009 | Sengupta et al. |
| 2010/0074053 A1 | 3/2010 | Jaiswal et al. |
| 2011/0098996 A1 | 4/2011 | Nicoles et al. |
| 2012/0241166 A1 | 9/2012 | Sun |
| 2013/0297273 A1 | 11/2013 | Altundas et al. |
| 2014/0043934 A1 | 2/2014 | Vasconcelos |
| 2014/0257780 A1 | 9/2014 | Jing et al. |

OTHER PUBLICATIONS

Stig B. Lyngsie, Rifting and lower crustal reflectivity: A case study of the intracratonic Dniepr-Donets rift zone, Ukraine, Journal of Geophysical Research, vol. 112, B12402, doi:10.1029/2006JB004795, 2007, 27 pages.*

Jacqueline Austermann, et al., A statistica analysis of the correlation between large igneous provinces and lower mantle structure Geophysical Journal International Advance Access published Jan. 22, 2014, pp. 1-9.

* cited by examiner

SYSTEM AND METHOD FOR ESTIMATING LATERAL POSITIONING UNCERTAINTIES OF A SEISMIC IMAGE

TECHNICAL FIELD

The disclosed embodiments relate generally to techniques for seismic data processing and interpretation, in particular to, system and method for estimating lateral positioning uncertainties of a seismic image.

BACKGROUND

Seismic imaging is a major tool used in the oil and gas exploration activities. One prerequisite of generating a high-quality seismic image of a subsurface region is an accurate velocity model of the subsurface region. Conversely, the inaccuracy of a velocity model used for generating a seismic image would inevitably introduce positioning uncertainties into the seismic image, which ultimately increases the risk of planning drill activities in the subsurface region.

SUMMARY

Accordingly, there is a need for methods to deal with the inaccuracy present in any velocity model used for generating a seismic image by estimating positioning uncertainties in the seismic image so as to reduce the risk of hydrocarbon exploration activities.

In accordance with some embodiments, a method of estimating lateral positioning uncertainties of a seismic image is performed at a computer system with one or more processors and memory for storing programs to be executed by the processors. The method includes receiving a velocity model, the velocity model including a plurality of base velocity values used for generating the seismic image, each base velocity value having a low limit and a high limit; deriving a plurality of lateral velocity gradient uncertainties from the velocity model; generating multiple lateral velocity gradient profiles, each lateral velocity gradient profile including a random realization of the plurality of lateral velocity gradient uncertainties; calculating perturbation raypaths originating from a surface point of the seismic image based on the velocity model and the multiple lateral velocity gradient profiles; and estimating a lateral positioning uncertainty for a target location at a predefined depth of the seismic image based on lateral distributions of the perturbation raypaths at the predefined depth.

In another aspect of the present application, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

In yet another aspect of the present application, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

BRIEF DESCRIPTION OF THE DRAWINGS

The aforementioned implementation of the application as well as additional implementations will be more clearly understood as a result of the following detailed description of the various aspects of the application when taken in conjunction with the following drawings.

Like reference numerals refer to corresponding parts throughout the drawings.

DETAILED DESCRIPTION OF EMBODIMENTS

Described below are methods, systems, and computer readable storage media that provide an approach of estimating lateral positioning uncertainties of a seismic image. In doing so, the methods, systems, and computer readable storage medium can be used to quantify the lateral positioning uncertainties of a seismic image caused by velocity uncertainties when interpreting the geological structures in a 2-D/3-D subsurface region.

Reference will now be made in detail to various embodiments, examples of which are illustrated in the accompanying drawings. In the following detailed description, numerous specific details are set forth in order to provide a thorough understanding of the present application and the embodiments described herein. However, embodiments described herein may be practiced without these specific details. In other instances, well-known methods, procedures, components, and mechanical apparatus have not been described in detail so as not to unnecessarily obscure aspects of the embodiments.

As noted above, uncertainties in a velocity model cause lateral positioning uncertainties in the seismic image generated from the velocity model. Although it is difficult to eliminate the uncertainties from the velocity model, it would still be advantageous to have a better understanding of the positioning uncertainties in the seismic image caused by such uncertainties. Therefore, one goal of the present application is to develop an efficient approach of quantifying the positioning uncertainties caused by velocity uncertainties for any target location within a seismic image. This approach provides at least two benefits. First, for a potential drilling hazard structural feature identified in the seismic image, the positioning uncertainty estimated according to the present application can be used to guide the drilling activity to stay away from such structural feature. Second, for a drill plan targeting a small or localized feature of a 2-D/3-D seismic image, multiple circles can be drawn around the feature, each representing a certain level of confidence (50%, 80%, 98%, etc) that it will enclose the target. In both cases, the drilling risk caused by the velocity uncertainties is mitigated.

Figure 1:
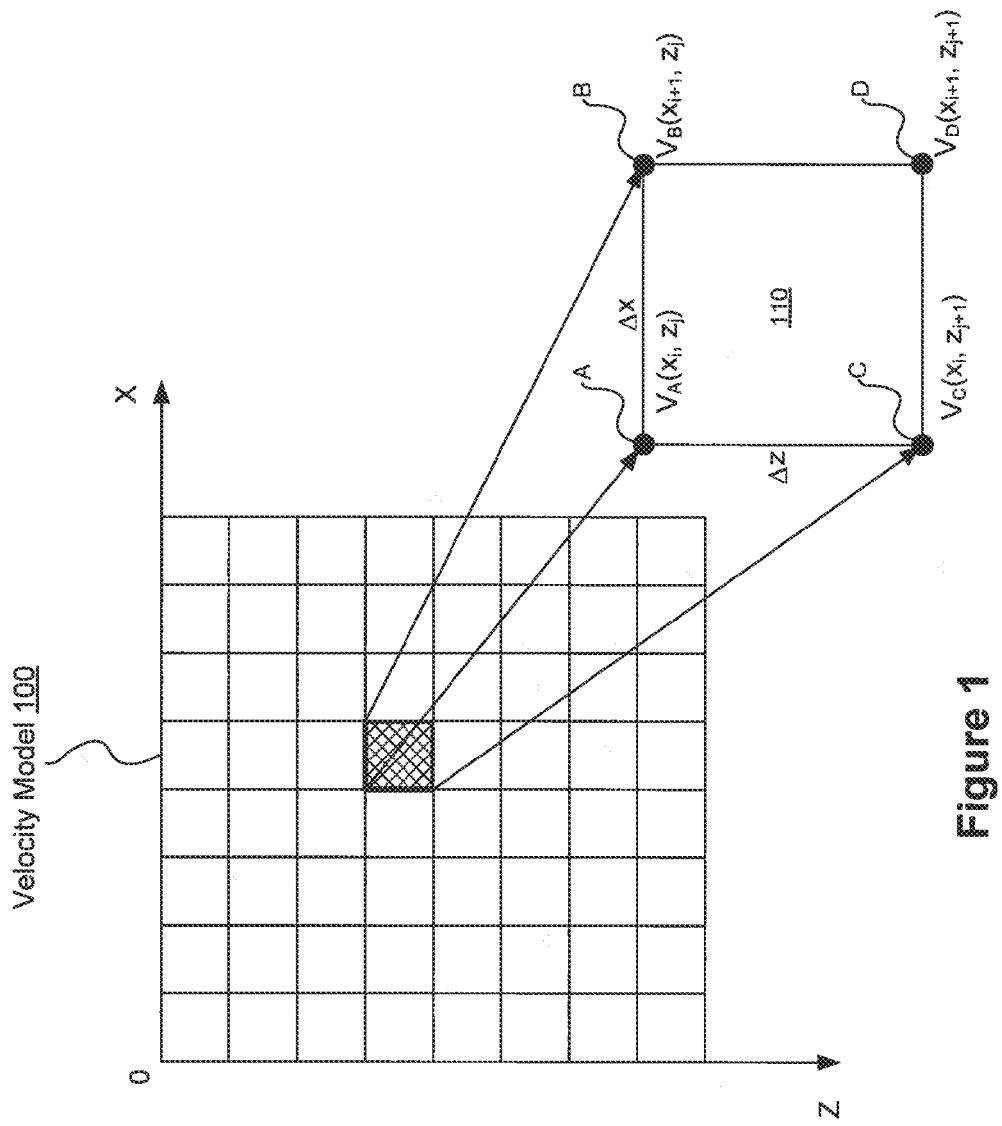
FIG. 1 is a schematic diagram of a 2-D velocity model including multiple grid points in accordance with some embodiments of the present application.

FIG. 1 is a schematic diagram of a 2-D velocity model including multiple grid points in accordance with some embodiments of the present application. Although a 2-D velocity model is used in the present application for illustrative purposes, it should be noted that the approach as described in the present application is applicable to both 2-D and 3-D velocity models. In this example, the velocity model 100 is represented by a 2-D mesh of grid points in the x-z plane, x representing a lateral direction and z representing the depth of the velocity model. As shown in the figure, a rectangular grid 110 has a size of ($\Delta x$, $\Delta z$) and the velocity values at the four grid points A, B, C, and D are:

A: $V_A(x_i, z_j)$,
B: $V_B(x_{i+1}, z_j)$,
C: $V_C(x_i, z_{j+1})$, and
D: $V_D(x_{i+1}, z_{j+1})$ For this velocity model, the vertical velocity gradient $G(x_i, z_j)$ and lateral velocity gradient $g(x_i, z_j)$ at the grid point A can be defined as:

$$G(x_i, z_j) = \frac{V_C(x_i, z_{j+1}) - V_A(x_i, z_j)}{\Delta z}, \text{ and}$$

$$g(x_i, z_j) = \frac{V_B(x_{i+1}, z_j) - V_A(x_i, z_j)}{\Delta x}.$$

Figure 2A:
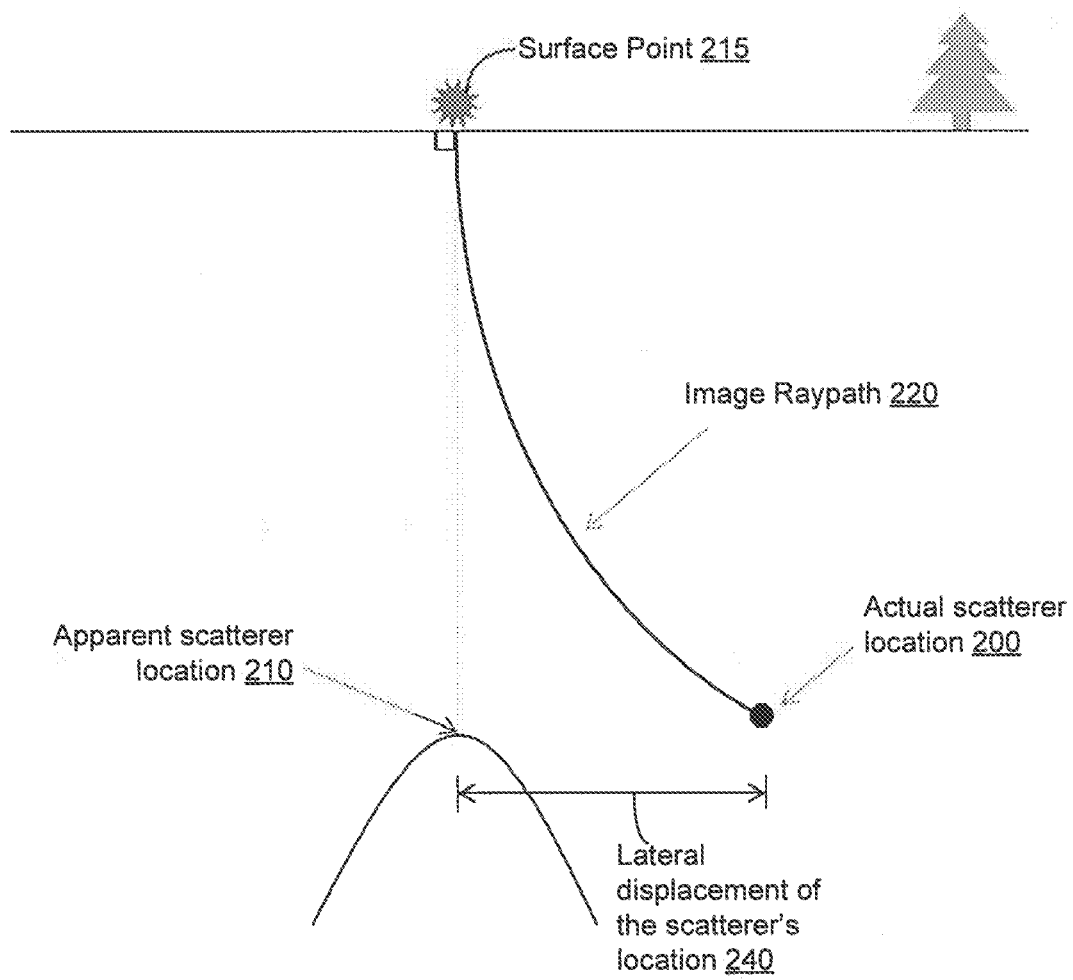
FIG. 2A is a schematic diagram illustrating the lateral displacements between a scatterer's actual location and apparent location caused by velocity variations in accordance with some embodiments of the present application.

Due to the depositional nature of geological structures, the seismic wave propagation velocity typically increases along the depth axis of the velocity model. But the geological movement also causes the lateral variation of velocity. The variation of velocity in either direction results in displacement between a scatterer's actual location and its apparent location in the lateral and vertical directions. FIG. 2A is a schematic diagram illustrating the lateral displacement 240 between a scatterer's actual location 200 and apparent location 210 caused by velocity variations in accordance with some embodiments of the present application. The apparent scatterer location 210 corresponds to the location of the scatterer in a post-stack section of unmigrated seismic data, which is directly below a surface point 215 where a virtual pair of source and receiver are co-located. Note that the magnitude of lateral displacements of the scatterer depends on the magnitude of velocity variation of this subsurface region. The greater the velocity variation the greater the displacement. One method of moving the scatterer from the apparent location 210 to the actual location 200 in a variable velocity model is to perform an image ray tracing (represented by the image raypath 220) starting from the surface point 215 in a direction perpendicular to the surface using the actual velocity model. A more detailed description of image raypath can be found in an article entitled "Time migration—some ray theoretical aspects" by P. Hubral (Geophysical Prospecting, Volume 25, Issue 4, pages 738-745, December 1977), which is incorporated by reference in its entirety. But since the velocity model has inherent uncertainties, there are inevitably lateral positioning uncertainties of the scatterer in the result of performing image ray tracing using the velocity model.

Figure 2B:
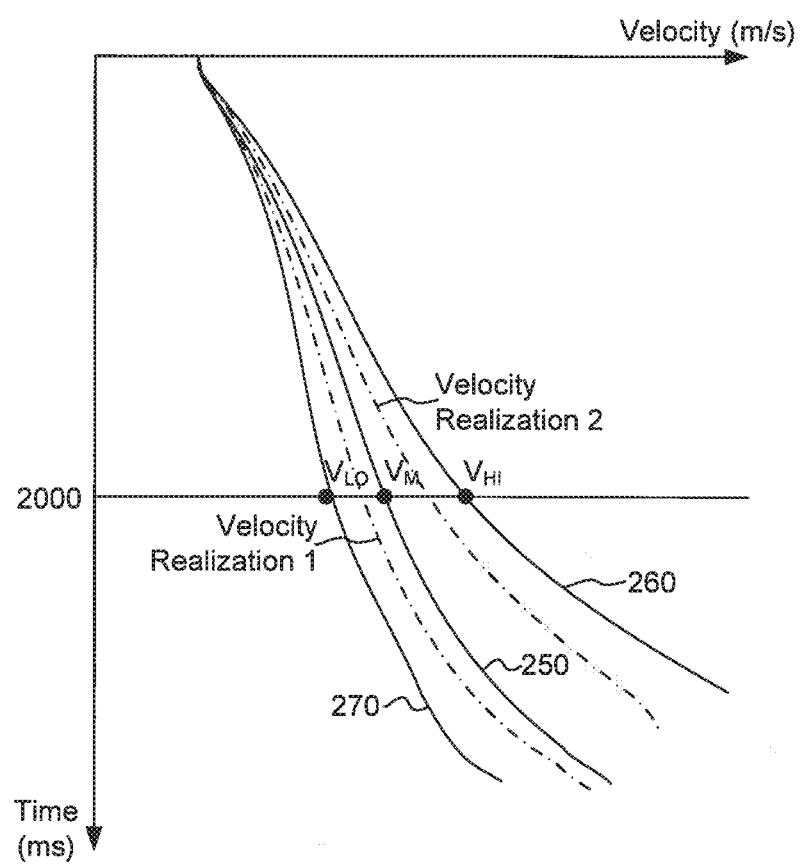
FIG. 2B illustrates a velocity profile, its uncertainty range and realizations at a particular surface location estimated from a seismic data gather in accordance with some embodiments of the present application.

One aspect of the present application is to estimate the lateral positioning uncertainty of a structure of interest in a seismic image, which is caused by the velocity uncertainties in the velocity model used for generating the seismic image. To do so, it is necessary to quantify the velocity uncertainties in the velocity model. There are many well-known methods of estimating seismic wave propagation velocity uncertainties using seismic data. One of the methods is disclosed in U.S. Pat. No. 8,694,262, entitled "System and method for subsurface characterization including uncertainty estimation," which is incorporated by reference in its entirety. But it would be apparent to those skilled in the art that the present application is applicable to both isotropic velocity model and anisotropic velocity model (including the tilted transverse isotropic velocity model). The velocity uncertainty at a particular location of a velocity model derived from this method is defined as a range of velocity, the range of velocity including a base velocity value, a low limit and a high limit. FIG. 2B illustrates a velocity profile, its uncertainty range and realizations at a particular surface location estimated from a seismic data gather in accordance with some embodiments of the present application. In this example, the horizontal axis represents the magnitude of seismic wave propagation velocity and the vertical axis represents the two-way travel time of seismic wave. As shown in the figure, there are three curves in this velocity profile. The curve 250 represents the base velocity of the velocity profile; the curve 260 represents the high limit of the velocity profile; and the curve 270 represents the low limit of the velocity profile. For example, at travel time 2000 ms (which can be converted into a specific depth of the velocity model shown in FIG. 1), the base velocity value and its low limit and high limit are: $V_M$, $V_{LO}$, and $V_{HI}$, respectively. In some embodiments, the base velocity value $V_M$ is the velocity used for generating the seismic image. The range defined by $V_{LO}$ and $V_{HI}$ represents the velocity uncertainty of the velocity model, which translates into lateral positioning uncertainties in the seismic image when a velocity value within the range but different from the base velocity value $V_M$ is used for generating the seismic image.

Figure 2C:
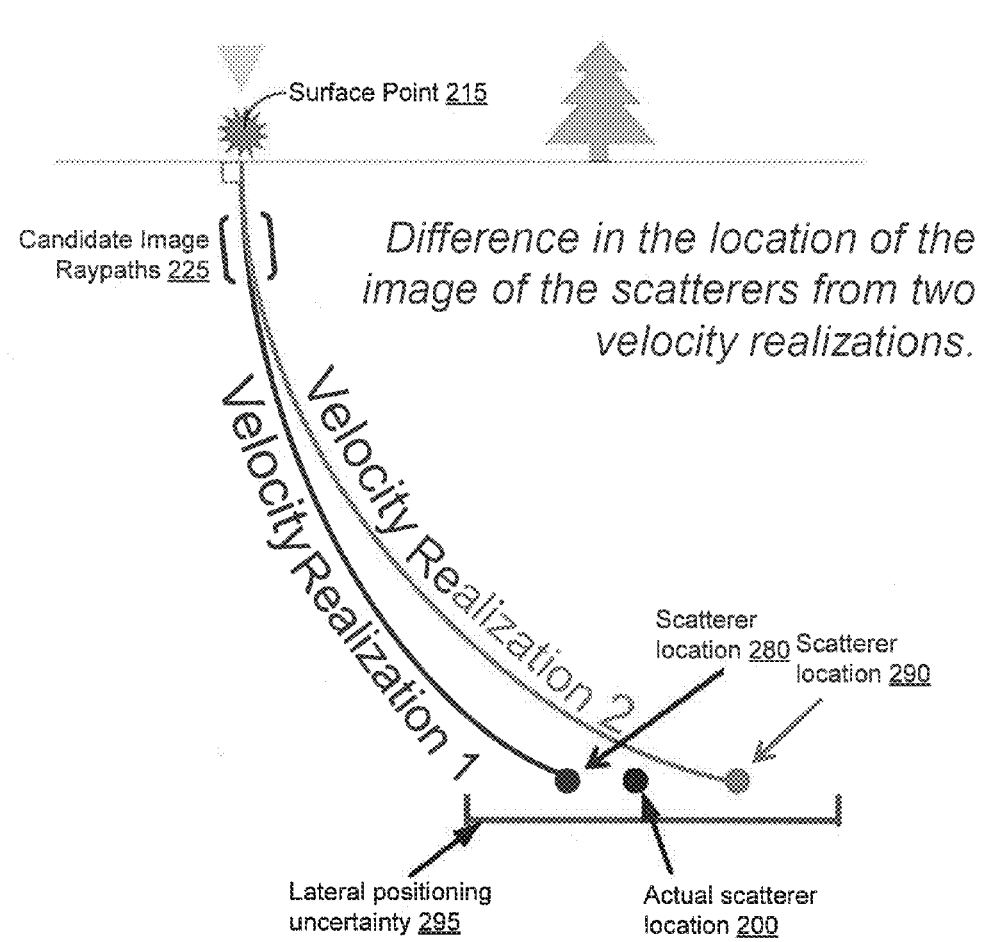
FIG. 2C is a schematic diagram illustrating two image raypaths corresponding to different velocity realizations of the velocity profile shown in FIG. 2B and corresponding scatterer locations in accordance with some embodiments of the present application.

In some embodiments, a number of random realizations of velocity curves within the range defined by $V_{LO}$ and $V_{HI}$ are used for estimating the lateral positioning uncertainties. FIG. 2B depicts two velocity curves, velocity realization 1 and velocity realization 2, that are located between the curve 260 and the curve 270. Each velocity realization is determined by a random number chosen within a range that has a one-to-one mapping relationship with the velocity range defined by $V_{LO}$ and $V_{HI}$. FIG. 2C is a schematic diagram illustrating two image raypaths corresponding to the two velocity realizations shown in FIG. 2B and the corresponding scatterer locations in accordance with some embodiments of the present application. As shown in the figure, both candidate image raypaths 225 are perpendicular to the surface when originating from the surface points 215. But the two image raypaths start deviating from each other as they go deeper into the subsurface region because the two image raypaths are generated by two different realizations. In particular, because the velocity value of the velocity realization 2 is greater than that of the velocity realization 1, the image raypath corresponding to the velocity realization 2 reaches the scatterer location 290, which is to the right of the actual scatterer location 200, and the image raypath corresponding to the velocity realization 1 reaches the scatterer location 280, which is to the left of the actual scatterer location 200. Thus, by generating a sufficient number of image raypaths using different velocity realizations within the velocity uncertainties as shown in FIG. 2B, it is possible to determine a lateral positioning uncertainty 295 of the scatterer at a particular depth. It is also possible to associate a confidence level for the lateral positioning uncertainty 295 based on the number of image raypaths located within the range relative to the total number of image raypaths originating from the source point 215.

There are many known methods of calculating the image raypath for a particular velocity model, some being more accurate and some being more efficient. In order to determine the lateral positioning uncertainty of a seismic image, a large number of candidate image raypaths need to be generated for each surface point. In this case, a ray tracing scheme's efficiency is often more important than its accuracy. Note that a seismic raypath is a circular segment when the seismic raypath traces in a 1-D velocity model that has a constant velocity gradient. A more detailed description of the algorithm can be found in an article entitled "Lessons in Seismic Computing" by M. M. Slotnick, published by Society of Exploration Geophysicists, Oklahoma, 1959, which is incorporated by reference in its entirety. This ray tracing scheme is very efficient because it is an analytical solution, not a numerical solution. In some embodiments, the velocity uncertainties as shown in FIG. 2B are converted into lateral velocity gradient uncertainties in order to take advantage of the analytical ray tracing solution. To do so, the velocity uncertainty at a particular location of the velocity model is first converted into a vertical velocity gradient uncertainty, which is then translated into a lateral velocity gradient uncertainty at the particular location. For example, according to the definition of vertical velocity gradient as described above in connection with FIG. 1, the vertical velocity gradients of the base velocity value and its low limit and high limit as shown in FIG. 2B can be defined as follows:

$$G_M = \frac{V_M(x_i, z_{j+1}) - V_M(x_i, z_j)}{\Delta z},$$

$$G_{LO} = \frac{V_{LO}(x_i, z_{j+1}) - V_{LO}(x_i, z_j)}{\Delta z}, \text{ and}$$

$$G_{HI} = \frac{V_{HI}(x_i, z_{j+1}) - V_{HI}(x_i, z_j)}{\Delta z}.$$

Given the three vertical velocity gradients above, the vertical velocity gradient uncertainty at the same location can be defined as follows:

$$\sigma_V = (|G_{LO} - G_M| + |G_{HI} - G_M|)/2$$

Assuming that the ratio between the lateral velocity gradient uncertainty and the vertical velocity gradient uncertainty at a particular location of the velocity model is the same as the ratio between the lateral velocity gradient $g(x_i, z_j)$ and the vertical velocity gradient $G(x_i, z_j)$ at the same location, the lateral velocity gradient uncertainty can be defined as follows:

$$\sigma_H = \sigma_V \frac{g(x_i, z_j)}{G(x_i, z_j)}.$$

In some other embodiments, the ratios between the lateral velocity gradient $g(x_i, z_j)$ and the vertical velocity gradient $G(x_i, z_j)$ at different points of the velocity model are averaged such that a constant ratio of the lateral velocity gradient and the vertical velocity gradient for the entire velocity model is used for converting the vertical velocity gradient uncertainty into the lateral velocity gradient uncertainty at different points.

As such, the velocity uncertainty defined by the range between $V_{LO}$ and $V_{HI}$ at a particular location is now converted into a lateral velocity gradient uncertainty $\sigma_H$ at the same location. Accordingly, the i-th random realization of the velocity profile between $V_{LO}$ and $V_{HI}$ become the i-th random realization of the lateral velocity gradient uncertainty $\sigma_H$ as follows:

$$\sigma_{Hi} = 2\sigma_H(\text{rand} - 0.5),$$

where rand is a random number between 0 and 1.

Given a random realization of lateral velocity gradient uncertainties associated with a velocity model including a plurality of base velocity values, it is possible to calculate the image raypaths using the analytical ray tracing solution as described above. FIGS. 3A and 3B are block diagrams illustrating how to calculate raypath segments in different velocity models, each have a constant lateral velocity gradient, in accordance with some embodiments of the present application. Because each random realization is a perturbation to the base velocity value, an image raypath calculated by this scheme is referred to as a "perturbation raypath" in this application.

Figure 3:
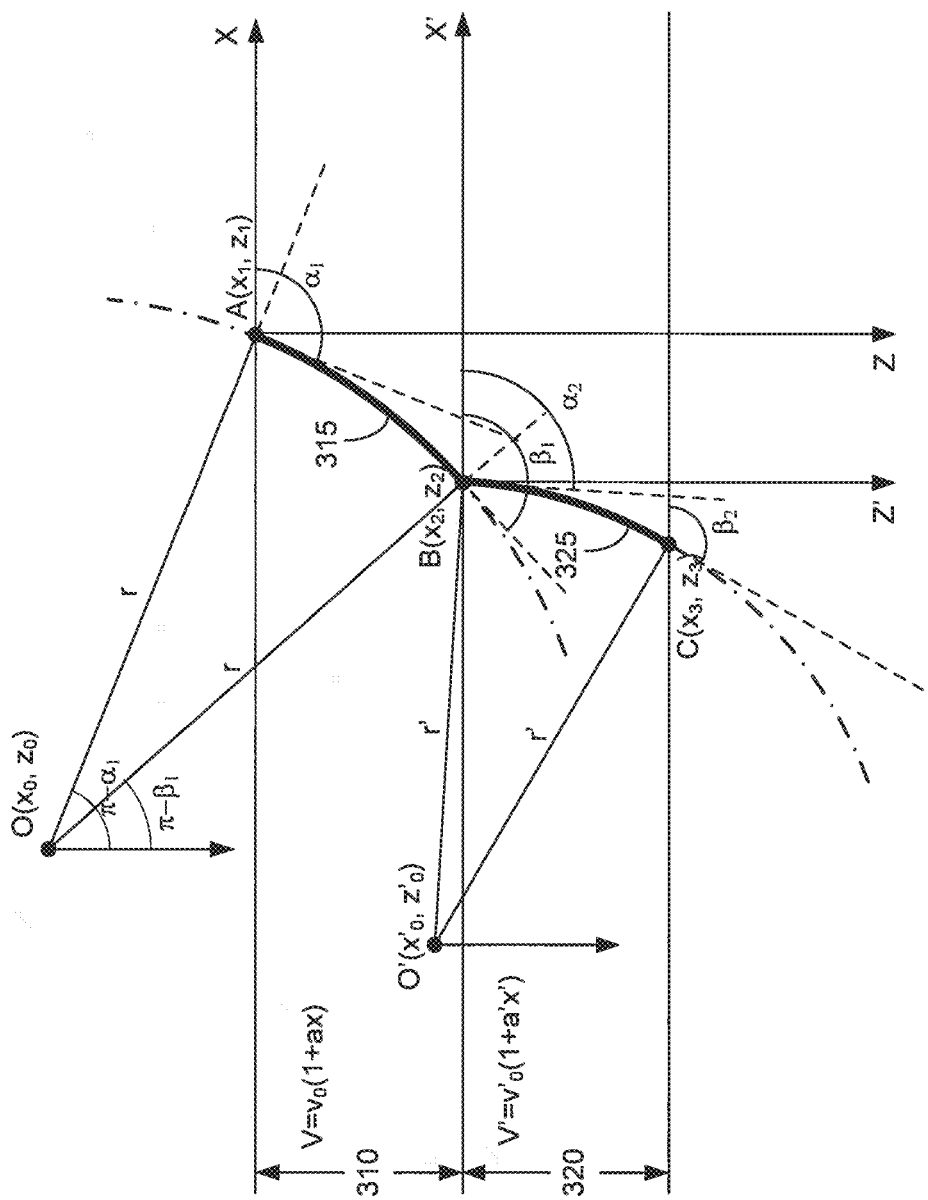
FIG. 3 is a schematic diagram illustrating how to calculate raypath segments in a layered velocity model, each layer having a constant lateral velocity gradient, in accordance with some embodiments of the present application.

FIG. 3 is a schematic diagram illustrating how to calculate perturbation raypath segments in a layered velocity model, each layer having a constant lateral velocity gradient, in accordance with some embodiments of the present application. In this example, the velocity model is defined as:

$$v = v_0(1 + ax) \text{ in the layer 310, and}$$

$$v' = v'_0(1 + a'x') \text{ in the layer 320,}$$

where a and a' are the lateral velocity gradients in each layer. As noted above, it can be proved that the perturbation raypath in a layer having a constant lateral velocity gradient is part of a circle. Therefore, there is an analytical solution to the perturbation raypath segments shown in FIG. 3.

For example, assuming that the coordinates of the incident position A of the perturbation raypath segment 315 within the layer 310 are $(x_1, z_1)$, its trajectory angle relative to the lateral axis x (not the vertical axis z) is $\alpha_1$, and its velocity at the incident position is $v_1$, the ray parameter $p_1$ of the raypath relative to the lateral axis x (not the vertical axis z) within the layer 310 is defined as:

$$p_1 = \frac{\sin \alpha_1}{v_1}.$$

Therefore, the coordinates $(x_0, z_0)$ of the center O of a circle including the perturbation raypath segment 315 can be defined as:

$$x_0 = x_1 - r \sin \alpha_1, \text{ and}$$

$$z_0 = z_1 + r \cos \alpha_1,$$

wherein the radius of the circle is defined as:

$$r = \frac{1}{ap_1}.$$

Given the position of the center O of the circle, the coordinates of the exit position B of the perturbation raypath segment 315 within the layer 310 can be defined as:

$$x_2 = x_0 + r \sin \beta_1, \text{ and}$$

$$z_2 = z_0 + r \cos \beta_1.$$

As shown in FIG. 3, the perturbation raypath enters the velocity layer 320 at the position B and the velocity layer 320 has a different base velocity value and a different lateral velocity gradient. It is well-known that the direction of the incident raypath (e.g., 315) and the direction of the exit raypath (e.g., 325) are governed by the Snell's Law. Assuming that the velocities at both sides of the position B on the interface separating the layer 310 and the layer 320 are $v_{i1}$ and $v_{o2}$, the trajectory angle $\alpha_2$ of the perturbation raypath segment 325 relative to the lateral axis x' can be defined as:

$$\frac{\cos \beta_1}{v_{i1}} = \frac{\cos \alpha_2}{v_{o2}}.$$

Given the coordinates $(x_2, z_2)$ of the incident position B of the perturbation raypath segment 325 within the layer 320, its trajectory angle $\alpha_2$ relative to the lateral axis x', and its velocity $v_{o2}$ at the incident position, it is possible to calculate the perturbation raypath segment 325 using the same approach described above by calculating the center $O'(x'_0, z'_0)$ of the circle including the raypath segment 325, the radius r' of the circle, and the exit location $C(x_3, z_3)$ of the perturbation raypath segment within the layer 325. Therefore, by repeating the algorithm above for different random realizations of lateral velocity gradient uncertainties, it is possible to calculate multiple perturbation raypaths in an efficient manner.

Figure 4:
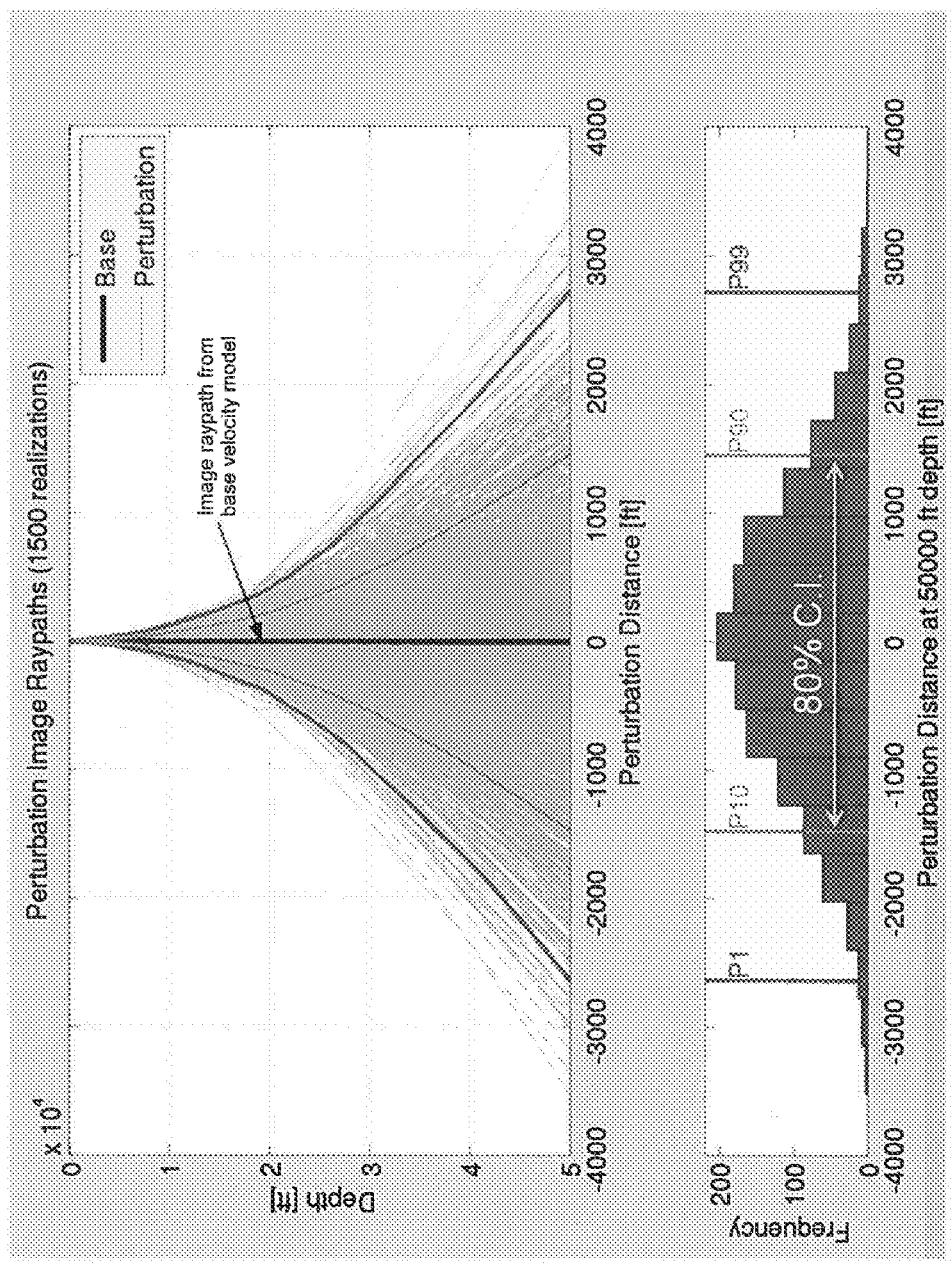
FIG. 4 is a two-part schematic diagram illustrating the distribution of perturbation raypaths relative to the image ray from the base velocity model measured by their perturbation distances in accordance with some embodiments of the present application.

FIG. 4 is a two-part schematic diagram illustrating the distribution of perturbation raypaths relative to the image ray from the base velocity model measured by their perturbation distances in accordance with some embodiments of the present application. The image ray from the base velocity model is drawn as a vertical line so that the horizontal axis represents perturbation distance because the perturbation distance of the base velocity image ray is zero at all depths by definition. Note that as shown in FIGS. 2A and 2B the actual image raypath from the base velocity model may be a curved raypath. Each perturbation raypath is an image ray from a velocity realization generated from a random perturbation of the base velocity model (e.g., by introducing a random realization of lateral velocity gradients to the base velocity model). A large number of velocity realizations (e.g., 1500) have been generated, and perturbation raypaths are shown for each realization in the top part of the figure. The bottom part of the figure shows the population distribution of perturbation distances for all realizations at the greatest depth, approximately 50,000 ft. The perturbation distances are distributed more or less evenly in a bell-shaped distribution, from which estimates of lateral positioning uncertainty can be made according to a specified confidence interval. As shown in the bottom part of the figure, the point on the horizontal axis labeled, p10, shows where 10% of perturbation raypaths intersect the horizontal axis to the left this point at 50,000 ft. The point labeled, p90, shows where 90% of raypaths intersect the 50,000 ft depth surface to the left. The distance between the p10 and p90 points on the horizontal axis yields bounds within which we estimate the lateral positioning uncertainty at an 80% confidence interval (i.e., we are 80% certain that the actual image location will lie within these bounds). The analysis above describes calculations for one surface location. The analysis proceeds in a similar manner for each of multiple surface locations. The number of locations in the analysis can be hundreds or thousands, as required to generate estimates of lateral positioning uncertainty at any point in the subsurface where uncertainty estimates are desired.

Figure 5:
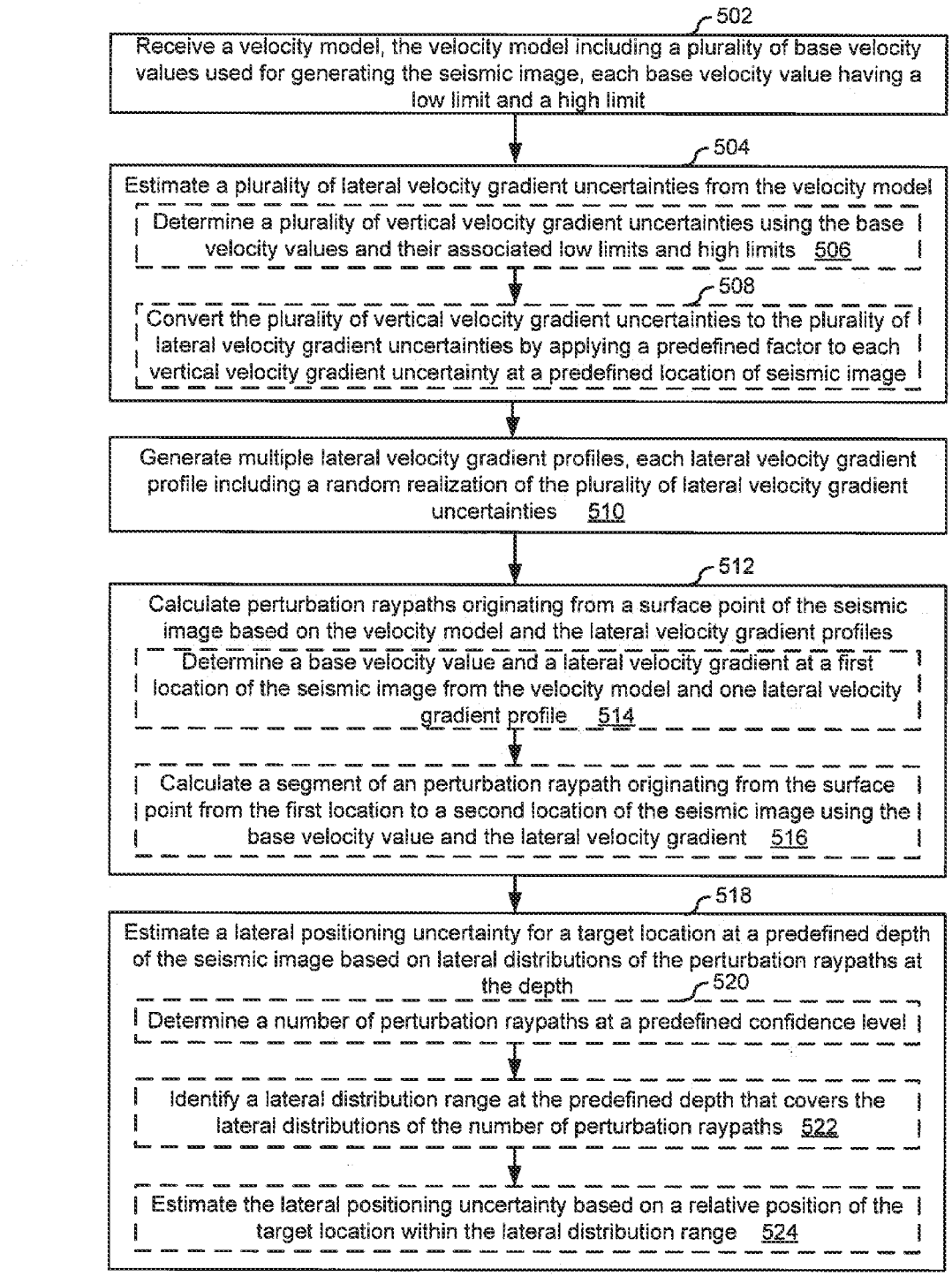
FIG. 5 is an exemplary process flowchart of estimating lateral positioning uncertainties of a seismic image in accordance with some embodiments of the present application.

FIG. 5 is an exemplary process flowchart of a method of estimating lateral positioning uncertainties of a seismic image in accordance with some embodiments of the present application. The method is performed at a computer system having one or more processors and memory storing programs to be executed by the one or more processors. The computer system receives (502) a velocity model. As shown in FIG. 1, the velocity model includes a plurality of base velocity values used for generating the seismic image using a seismic dataset. These base velocity values may also be derived from the seismic dataset, each base velocity value having a low limit and a high limit (see, e.g., FIG. 2B). Using the velocity model, the computer system derives (504) a plurality of lateral velocity gradient uncertainties. As noted above in connection with FIGS. 2A-2C, the computer system first determines (506) a plurality of vertical velocity gradient uncertainties using the base velocity values and their associated low limits and high limits and then converts (508) the plurality of vertical velocity gradient uncertainties to the plurality of lateral velocity gradient uncertainties by applying a predefined factor to each vertical velocity gradient uncertainty at a predefined location of seismic image. In some embodiments, the vertical velocity gradient uncertainty at the predefined location of the seismic image is defined as an average of differences in vertical velocity gradient between the corresponding base velocity value and its low limit and high limit of the velocity model as described above in connection with FIG. 2A. The predefined factor is defined as a ratio between a lateral velocity gradient and a vertical velocity gradient at a predefined location of the seismic image, which are described above in connection with FIG. 1.

Using the plurality of lateral velocity gradient uncertainties, the computer system generates (510) multiple lateral velocity gradient profiles, each lateral velocity gradient profile including a random realization of the plurality of lateral velocity gradient uncertainties. For each random realization, any location in the velocity model has a base velocity value and a lateral velocity gradient value randomly selected from the location's lateral velocity gradient uncertainty.

Next, the computer system calculates (512) perturbation raypaths originating from a surface point of the seismic image based on the velocity model and the lateral velocity gradient profiles. In some embodiments, the calculation of the perturbation raypaths is an iterative process. The process begins with determining (514) a base velocity value and a lateral velocity gradient at a first location of the seismic image from the velocity model and one lateral velocity gradient profile and then calculating (516) a segment of a perturbation raypath originating from the surface point from the first location to a second location of the seismic image using the base velocity value and the lateral velocity gradient. As noted above, there is an analytical solution to the ray tracing question in a velocity model that has a constant velocity gradient. The process repeats the determining and calculating steps until the perturbation raypath exceeds a predefined depth of the seismic image (e.g., the depth level of the target location in the seismic image). When the first location and the second location are at two sides of an interface between two different velocity layers, the process includes the step of updating a direction of the segment of the perturbation raypath using the local velocity value at the first location and the local velocity value at the second location in accordance with Snell's Law.

After calculating a predefined number (e.g., 1000) of perturbation raypaths, the computer system estimates (518) a lateral positioning uncertainty for a target location at a predefined depth of the seismic image based on lateral distributions of the perturbation raypaths at the predefined depth. In some embodiments, this step further includes: determining (520) a number of perturbation raypaths according to a predefined confidence level; identifying (522) a lateral distribution range at the predefined depth that covers the lateral distributions of the number of perturbation raypaths; and estimating (524) the lateral positioning uncertainty based on a relative position of the target location within the lateral distribution range.

Figure 6:
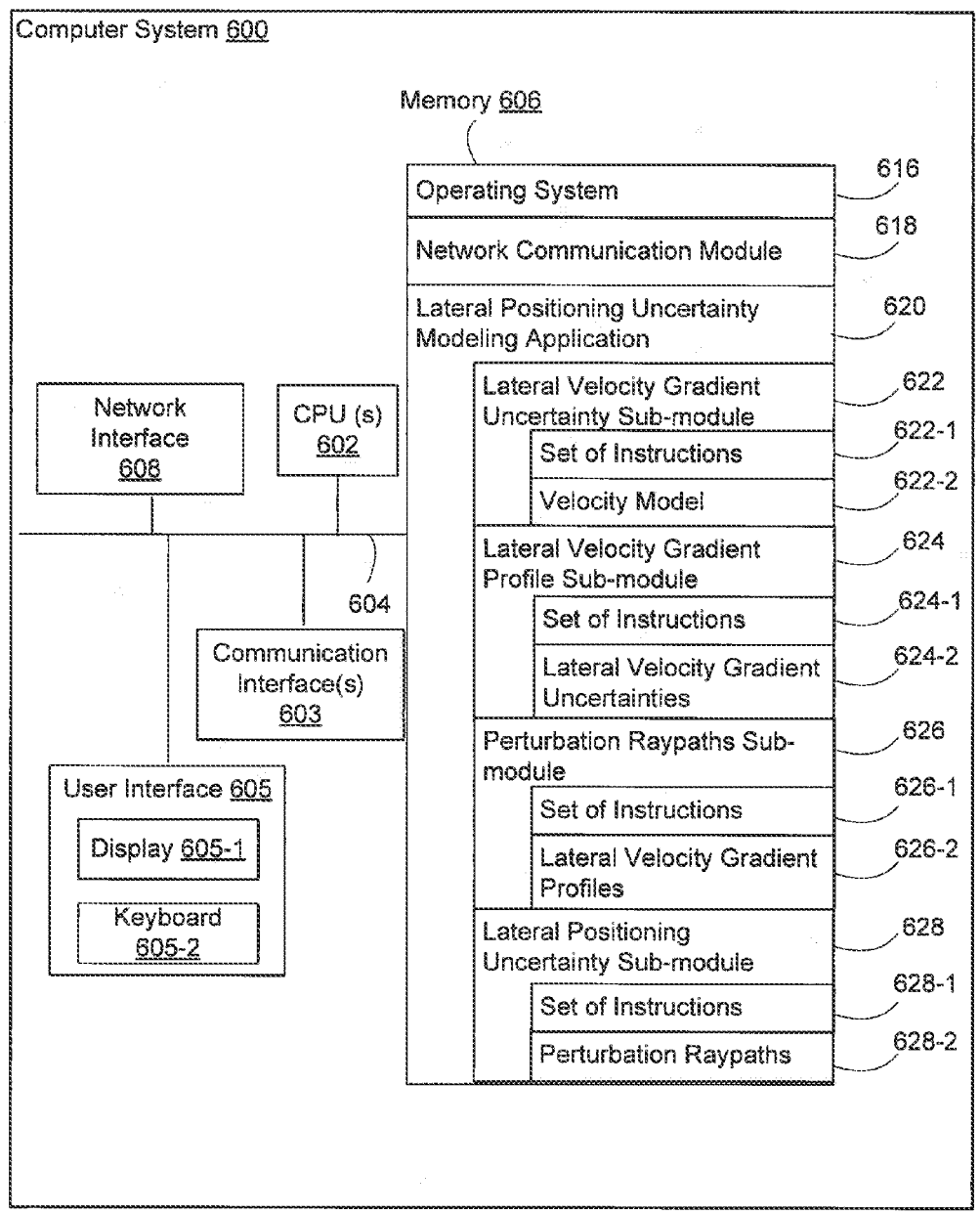
FIG. 6 is a schematic block diagram illustrating a computer system for implementing the method described in connection with FIG. 5 in accordance with some embodiments of the present application.

FIG. 6 is a schematic block diagram illustrating a computer system for implementing the method described in connection with FIG. 5 in accordance with some embodiments of the present application. While certain specific features are illustrated, those skilled in the art will appreciate from the present application that various other features have not been illustrated for the sake of brevity and so as not to obscure more pertinent aspects of the embodiments disclosed herein.

In some embodiments, the computer system 600 includes one or more processing units (CPU's) 602, one or more network interfaces 608 or other communications interfaces 603, memory 606, and one or more communication buses 604 for interconnecting these and various other components. The computer system 600 also includes a user interface 605 (e.g., a display 605-1 and a keyboard 605-2). The communication buses 604 may include circuitry (sometimes called a chipset) that interconnects and controls communications between system components. Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPUs 602. Memory 606, including the non-volatile and volatile memory devices within memory 606, comprises a non-transitory computer readable storage medium.

In some embodiments, memory 606 or the non-transitory computer readable storage medium of memory 606 stores the following programs, modules and data structures, or a subset thereof including an operating system 616, a network communication module 618, and a lateral positioning uncertainty modeling application 620.

The operating system 616 includes procedures for handling various basic system services and for performing hardware dependent tasks. The network communication module 618 facilitates communication with other devices (e.g., a remote computer server) via the communication network interfaces 608 (wired or wireless) and one or more communication networks, such as the Internet, other wide area networks, local area networks, metropolitan area networks, and so on.

In some embodiments, the lateral positioning uncertainty modeling application 620 further includes:
- a lateral velocity gradient uncertainty sub-module 622 that includes a set of instructions 622-1 for deriving a plurality of lateral velocity gradient uncertainties from a velocity model 622-2;
- a lateral velocity gradient profile sub-module 624 that includes a set of instructions 624-1 for generating a plurality of lateral velocity gradient profiles using random realizations of a plurality of lateral velocity gradient uncertainties 624-2;
- a perturbation raypaths sub-module 626 that includes a set of instructions 626-1 for calculating perturbation raypaths using a plurality of lateral velocity gradient profiles 626-2; and
- a lateral positioning uncertainty sub-module 628 that includes a set of instructions 628-1 for estimating the lateral positioning uncertainty of a target location within a seismic image based on the intercepting positions of the perturbation raypaths 628-2.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of estimating lateral positioning uncertainties of a seismic image, the method comprising:
at a computer system having one or more processors and memory storing programs to be executed by the one or more processors:
receiving a velocity model, the velocity model including a plurality of velocity profiles, a velocity profile comprising a lateral velocity gradient ($g(x_i,z_j)$) in a direction orthogonal to a raypath, a vertical velocity gradient ($G(x_i,z_j)$) in a direction coincident with the raypath, a base velocity value ($V_M$) used by the velocity model for generating the seismic image, and a velocity range including the base velocity, wherein the velocity range extends between a low limit ($V_{LO}$) and a high limit ($V_{HI}$) and the difference between the base velocity and either the low limit or the high limit represents an uncertainty in the base velocity;
deriving a plurality of lateral velocity gradient uncertainties as functions of the lateral velocity gradients;
generating multiple lateral velocity gradient profiles, each lateral velocity gradient profile including a random realization of the plurality of lateral velocity gradient uncertainties;
calculating perturbation raypaths originating from a surface point of the seismic image based on the velocity model and the multiple lateral velocity gradient profiles; and
estimating a lateral positioning uncertainty for a target location at a predefined depth of the seismic image based on lateral distributions of the perturbation raypaths at the predefined depth.

2. The method of claim 1, wherein the velocity model is estimated from a seismic dataset used for generating the seismic image.

3. The method of claim 1, wherein deriving a plurality of lateral velocity gradient uncertainties further includes:
determining a plurality of vertical velocity gradient uncertainties using the base velocity values and their associated low limits and high limits; and
converting the plurality of vertical velocity gradient uncertainties to the plurality of lateral velocity gradient uncertainties by applying a predefined factor to each vertical velocity gradient uncertainty at a predefined location of the seismic image.

4. The method of claim 3, wherein the vertical velocity gradient uncertainty at the predefined location of the seismic image is defined as an average of differences in vertical velocity gradient between the corresponding base velocity value and its low limit and high limit of the velocity model.

5. The method of claim 3, wherein the predefined factor is defined as a ratio between a lateral velocity gradient and a vertical velocity gradient at the predefined location of the seismic image.

6. The method of claim 5, wherein the lateral velocity gradient and the vertical velocity gradient at the predefined location of the seismic image is determined by the corresponding base velocity values of the velocity model.

7. The method of claim 1, wherein calculating perturbation raypaths originating from a surface point of the seismic image further includes:
determining a base velocity value and a lateral velocity gradient at a first location of the seismic image from the velocity model and one lateral velocity gradient profile;
calculating a segment of a perturbation raypath originating from the surface point from the first location to a second location of the seismic image using the base velocity value and the lateral velocity gradient; and
repeating said determining and calculating steps until the perturbation raypath exceeds a predefined depth of the seismic image.

8. The method of claim 7, wherein the segment of the perturbation raypath is a circular segment defined by the base velocity value and the lateral velocity gradient.

9. The method of claim 7, further comprising:
updating a direction of the segment of the perturbation raypath using the base velocity value at the first location and the base velocity value at the second location in accordance with Snell's Law.

10. The method of claim 1, wherein estimating a lateral positioning uncertainty for a target location further includes:
determining a number of perturbation raypaths according to a predefined confidence level;
identifying a lateral distribution range at the predefined depth that covers the lateral distributions of the number of perturbation raypaths; and
estimating the lateral positioning uncertainty based on a relative position of the target location within the lateral distribution range.

11. A computer system, comprising:
one or more processors;
memory; and
one or more programs, wherein the one or more program modules are stored in the memory and configured to be executed by the one or more processors, the one or more program modules including instructions that, when executed by the one or more processors, cause the computer system to:
receive a velocity model, the velocity model including plurality of velocity profiles, a velocity profile comprising a lateral velocity gradient ($g(x_i,z_j)$) in a direction orthogonal to a raypath, a vertical velocity gradient ($G(x_i,z_j)$) in a direction coincident with the raypath, a base velocity value ($V_M$) used by the velocity model for generating the seismic image, and a velocity range including the base velocity, wherein the velocity range extends between a low limit ($V_{LO}$) and a high limit ($V_{HI}$) and the difference between the base velocity and either the low limit or the high limit represents an uncertainty in the base velocity;
derive a plurality of lateral velocity gradient uncertainties as functions of the lateral velocity gradients;
generate multiple lateral velocity gradient profiles, each lateral velocity gradient profile including a random realization of the plurality of lateral velocity gradient uncertainties;

calculate perturbation raypaths originating from a surface point of the seismic image based on the velocity model and the multiple lateral velocity gradient profiles; and estimate a lateral positioning uncertainty for a target location at a predefined depth of the seismic image based on lateral distributions of the perturbation raypaths at the predefined depth.

12. The computer system of claim 11, wherein the velocity model is estimated from a seismic dataset used for generating the seismic image.

13. The computer system of claim 11, wherein the instruction for deriving a plurality of lateral velocity gradient uncertainties further includes instructions for:

determining a plurality of vertical velocity gradient uncertainties using the base velocity values and their associated low limits and high limits; and converting the plurality of vertical velocity gradient uncertainties to the plurality of lateral velocity gradient uncertainties by applying a predefined factor to each vertical velocity gradient uncertainty at a predefined location of the seismic image.

14. The computer system of claim 13, wherein the vertical velocity gradient uncertainty at the predefined location of the seismic image is defined as an average of differences in vertical velocity gradient between the corresponding base velocity value and its low limit and high limit of the velocity model.

15. The computer system of claim 13, wherein the predefined factor is defined as a ratio between a lateral velocity gradient and a vertical velocity gradient at the predefined location of the seismic image.

16. The computer system of claim 15, wherein the lateral velocity gradient and the vertical velocity gradient at the predefined location of the seismic image is determined by the corresponding base velocity values of the velocity model.

17. The computer system of claim 11, wherein the instruction for calculating perturbation raypaths originating from a surface point of the seismic image further includes instructions for:

determining a base velocity value and a lateral velocity gradient at a first location of the seismic image from the velocity model and one lateral velocity gradient profile;

calculating a segment of a perturbation raypath originating from the surface point from the first location to a second location of the seismic image using the base velocity value and the lateral velocity gradient; and repeating said determining and calculating steps until the perturbation raypath exceeds a predefined depth of the seismic image.

18. The computer system of claim 17, wherein the segment of the perturbation raypath is a circular segment defined by the base velocity value and the lateral velocity gradient.

19. The computer system of claim 17, wherein the one or more program modules further include instructions for:

updating a direction of the segment of the perturbation raypath using the base velocity value at the first location and the base velocity value at the second location in accordance with Snell's Law.

20. The computer system of claim 11, wherein the instruction for estimating a lateral positioning uncertainty for a target location further includes instructions for:

determining a number of perturbation raypaths according to a predefined confidence level;

identifying a lateral distribution range at the predefined depth that covers the lateral distributions of the number of perturbation raypaths; and estimating the lateral positioning uncertainty based on a relative position of the target location within the lateral distribution range.

21. A non-transitory computer readable storage medium storing one or more program modules, the one or more program modules comprising instructions, which when executed by a computer system having one or more processors and memory, cause the computer system to:

receive a velocity model, the velocity model including a plurality of velocity profiles, a velocity profile comprising a lateral velocity gradient ($g(x_i,z_j)$) in a direction orthogonal to a raypath, a vertical velocity gradient ($G(x_i,z_j)$) in a direction coincident with the raypath, a base velocity value ($V_M$) used by the velocity model for generating the seismic image, and a velocity range including the base velocity, wherein the velocity range extends between a low limit ($V_{LO}$) and a high limit ($V_{HI}$) and the difference between the base velocity and either the low limit or the high limit represents an uncertainty in the base velocity;

derive a plurality of lateral velocity gradient uncertainties from the velocity model;

generate multiple lateral velocity gradient profiles, each lateral velocity gradient profile including a random realization of the plurality of lateral velocity gradient uncertainties;

calculate perturbation raypaths originating from a surface point of the seismic image based on the velocity model and the multiple lateral velocity gradient profiles; and estimate a lateral positioning uncertainty for a target location at a predefined depth of the seismic image based on lateral distributions of the perturbation raypaths at the predefined depth.

* * * * *